United States Patent

Neugeboren

(10) Patent No.: US 12,335,030 B2
(45) Date of Patent: *Jun. 17, 2025

(54) SYSTEMS AND METHODS FOR LARGE PHASE CORRECTION IN R-PHY NETWORK ARCHITECTURES

(71) Applicant: ARRIS Enterprises LLC, Horsham, PA (US)

(72) Inventor: Yair Neugeboren, Netanya (IL)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,398

(22) Filed: Jan. 25, 2024

(65) Prior Publication Data

US 2024/0163001 A1 May 16, 2024

Related U.S. Application Data

(63) Continuation of application No. 17/118,260, filed on Dec. 10, 2020, now Pat. No. 11,984,969.

(60) Provisional application No. 62/946,308, filed on Dec. 10, 2019.

(51) Int. Cl.
*H04J 3/06* (2006.01)

(52) U.S. Cl.
CPC .......... *H04J 3/0667* (2013.01); *H04J 3/0641* (2013.01); *H04J 3/0697* (2013.01)

(58) Field of Classification Search
CPC ....... H04J 3/0667; H04J 3/0641; H04J 3/0697
See application file for complete search history.

(56) References Cited

U.S. PATENT DOCUMENTS

| | | | |
|---|---|---|---|
| 6,104,915 A | 8/2000 | Zhang et al. | |
| 8,320,411 B1 | 11/2012 | Sedarat et al. | |
| 8,982,777 B1 | 3/2015 | Pearson et al. | |
| 9,444,566 B1 | 9/2016 | Mustiere et al. | |
| 9,749,972 B2 * | 8/2017 | Bin Sediq | H04W 56/001 |
| 9,998,247 B1 | 6/2018 | Choudhury et al. | |
| 10,097,241 B1 | 10/2018 | Bogdan et al. | |
| 10,284,414 B2 | 5/2019 | Chaloupka et al. | |
| 10,433,270 B1 * | 10/2019 | Arab | H04W 36/165 |
| 10,944,818 B1 * | 3/2021 | Izenberg | H04L 67/1095 |
| 11,422,223 B2 * | 8/2022 | Kumar | H04W 64/00 |

(Continued)

FOREIGN PATENT DOCUMENTS

| | | |
|---|---|---|
| EP | 2688240 B1 | 6/2020 |
| WO | 2019177503 | 9/2019 |

(Continued)

OTHER PUBLICATIONS

Examination Report in European Patent Application No. 20838768. 8, dated Feb. 29, 2024.

(Continued)

*Primary Examiner* — Bailor C Hsu
(74) *Attorney, Agent, or Firm* — Chernoff, Vilhauer, McClung & Stenzel, LLP

(57) ABSTRACT

Systems and methods for regaining phase synchronization between a CMTS core and an RPD, where the phase synchronization is regained over repeated temporal periods preferably divided between a first interval having a frequency adjustment of a first magnitude and a second interval having a frequency adjustment of a second magnitude.

20 Claims, 3 Drawing Sheets

(56) References Cited

U.S. PATENT DOCUMENTS

| | | |
|---|---|---|
| 11,984,969 B2* | 5/2024 | Neugeboren ......... H04J 3/0667 |
| 2011/0261917 A1 | 10/2011 | Bedrosian |
| 2012/0069943 A1 | 3/2012 | Lim et al. |
| 2012/0117180 A1 | 5/2012 | Ranasinghe |
| 2013/0279525 A1 | 10/2013 | Zheng et al. |
| 2014/0064303 A1 | 3/2014 | Aweya et al. |
| 2014/0297815 A1 | 10/2014 | Rajapakse |
| 2015/0042682 A1 | 2/2015 | Jensen et al. |
| 2015/0052222 A1 | 2/2015 | Farrell et al. |
| 2015/0071309 A1 | 3/2015 | Aweya et al. |
| 2015/0295669 A1 | 10/2015 | Chapman et al. |
| 2018/0091291 A1 | 3/2018 | Haddad et al. |
| 2019/0334643 A1 | 10/2019 | Neugeboren et al. |
| 2020/0228272 A1* | 7/2020 | Soriaga ................ H04L 5/0048 |
| 2020/0343988 A1* | 10/2020 | Nandiraju ........... H04W 56/001 |
| 2021/0058181 A1 | 2/2021 | Dwivedi et al. |
| 2021/0105166 A1* | 4/2021 | Khoshnevisan ...... H04L 5/0094 |
| 2023/0319750 A1* | 10/2023 | Balevi .................. H04W 72/21 |
| | | 370/329 |

FOREIGN PATENT DOCUMENTS

| | | |
|---|---|---|
| WO | 2019209585 A1 | 10/2019 |
| WO | 2020124005 A2 | 6/2020 |
| WO | 2020124005 A3 | 6/2020 |

OTHER PUBLICATIONS

Office action in Japanese Patent Application No. 2022-535713, mailed Oct. 29, 2025.

DVB Organization: "CM-SP-R-DTI-106-171220.pdf", DVB, Digital Video Broadcasting, C/O EBU—17A Ancienne Route—CH-1218 Grand Saconnex, Geneva—Switzerland, Jan. 15, 2018 (Jan. 15, 2018), XP017854816, p. 15, paragraph 5.1; figure 1 p. 29, paragraph 5.5.3.3—p. 31; figures 12-15.

International Search Report and Written Opinion RE: Application No. PCT/US2020/064343, dated Mar. 23, 2021.

* cited by examiner

SYSTEMS AND METHODS FOR LARGE PHASE CORRECTION IN R-PHY NETWORK ARCHITECTURES

CROSS REFERENCE TO RELATED APPLICATIONS

This application is a continuation of U.S. patent application Ser. No. 17/118,260 filed on Dec. 10, 2020, which claims the benefit of U.S. Provisional Patent Application Ser. No. 62/946,308 filed Dec. 10, 2019 and entitled "SYSTEMS AND METHODS FOR LARGE PHASE CORRECTION IN R-PHY NETWORK ARCHITECTURES". The complete disclosure of the above application is hereby incorporated by reference for all purposes.

BACKGROUND

The subject matter of this application generally relates to synchronization of clocks in an R-PHY transmission network used to deliver data in LTE FDD mobile networks.

Although Cable Television (CATV) networks originally delivered television content to subscribers over large distances using an exclusively RF transmission system, modern CATV transmission systems have replaced much of the RF transmission path from a provider's head end to a subscriber's premises with a more effective optical network, creating a hybrid transmission system where cable content is transmitted over the bulk of the distance between the head and the subscriber using optical signals, but terminates as RF signals over coaxial cables.

Historically, the head end also included a Cable Modem Termination System (CMTS), used to provide high speed data services such as video, cable Internet, Voice over Internet Protocol, etc. Typically, a CMTS will include both Ethernet interfaces (or other more traditional high-speed data interfaces) as well as RF interfaces so that traffic that is coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the television delivery system (EdgeQAM) in a single platform called the Converged Cable Access Platform (CCAP).

As networks have expanded and head ends have accordingly become increasingly congested with equipment, many content providers have recently used distributed architectures to spread the functionality of the CMTS/CCAP throughout the network. This distributed architecture keeps the data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is the Remote PHY (R-PHY) distributed access architecture, which relocates the physical layer (PHY) of a traditional CMTS or CCAP by pushing it to the network's fiber nodes. Thus, while the core in the CMTS/CCAP performs the higher layer processing, the R-PHY device in the node converts the downstream data sent by the core from digital to analog to be transmitted on radio frequency, and converts the upstream RF data sent by cable modems from analog to digital format to be transmitted optically to the core.

Once the functionality of the CMTS/CCAP is divided between a core in the head end and various PHY devices throughout the network, however, protocols must be established to properly synchronize the core with the PHY devices. Synchronization between the core and the PHY devices becomes particularly problematic when the either the core or the R-PHY device loses connection to the timing clock used for synchronization (referred to as "holdover"). Even though each device will usually include its own oscillator to mark time, the oscillators of each device will nonetheless drift relative to each other once synchronization is lost, and upon reconnection the drift may have become so severe as to impede performance. Thus, upon reconnection, the drift must preferably be corrected without interruption of services to customers.

In addition, the R-PHY architecture has recently been proposed as a mechanism for exchanging data in cellular communications between the core network of a cellular system (typically the global Internet) and the local networks communicating with, e.g. a cell tower. This exchange is typically referred to as the "backhaul" portion of cellular communications. Cellular networks, however, also require synchronization of the backhaul portion of the network with the mobile base stations, with its own set of unique timing requirements. Thus, using an R-PHY network as a backhaul for cellular communications presents a challenge because the remote PHY devices after regaining connection to a master clock following holdover, must regain synchronization while meeting the disparate timing requirements of both a cellular network and the core of the R-PHY system. What is desired, therefore, are improved systems and methods for synchronizing a PHY device in an R-PHY architecture to both an R-PHY core and a cellular network.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

For purposes of the disclosure and the claims, the following terms are defined to as to more easily understand the subject matter described and claimed:

Master Clock: a clock that sends timing information to a slave clock for that clock to synchronize its time to that of the master clock.

Slave Clock: a clock that receives timing information from a master clock to synchronize its time to that of the master clock.

Grandmaster Clock: a clock that only operates as a master clock and is the source of time to the packet network:

Ordinary clock: a slave clock that has a single port receiving timing information from a master clock.

Boundary Clock: a clock that operates as both a slave and a master by having one port in a slave state receiving time from a master clock, and one or more ports in a master state which disseminate timing information to downstream slaves.

Evolved Node B (EnB): a base station used in Long Term Evolution (LTE) cellular networks, and which includes not only antennas, receivers, and transmitters, but also resource management and logic control functions historically included in separate base station controllers, thus allowing EnB stations to communicate with each other directly.

Synchronous Ethernet (SyncE): a computer networking standard that facilitates the transfer of timing signals over an Ethernet physical layer to be used by devices that need them. The SynchE timing signals should originate from a clock, and preferably a master clock.

Ethernet Equipment Clock (EEC): slave clocks in the SyncE protocol that receive synchronization data from an interface connected to an upstream master clock.

As already noted, in R-PHY systems the clocks of the Remote PHY Devices (RPDs) and the CCAP core must be synchronized for time scheduling of data transfers to work properly, and this synchronization must not only be of frequency, but also of phase. Hence, the Remote DTI (R-DTI) specification for example, requires the RPDs and the CCAP core to be phase aligned with less than a 1ms between the two. Two common topologies are used to provide proper synchronization.

Figure 1:
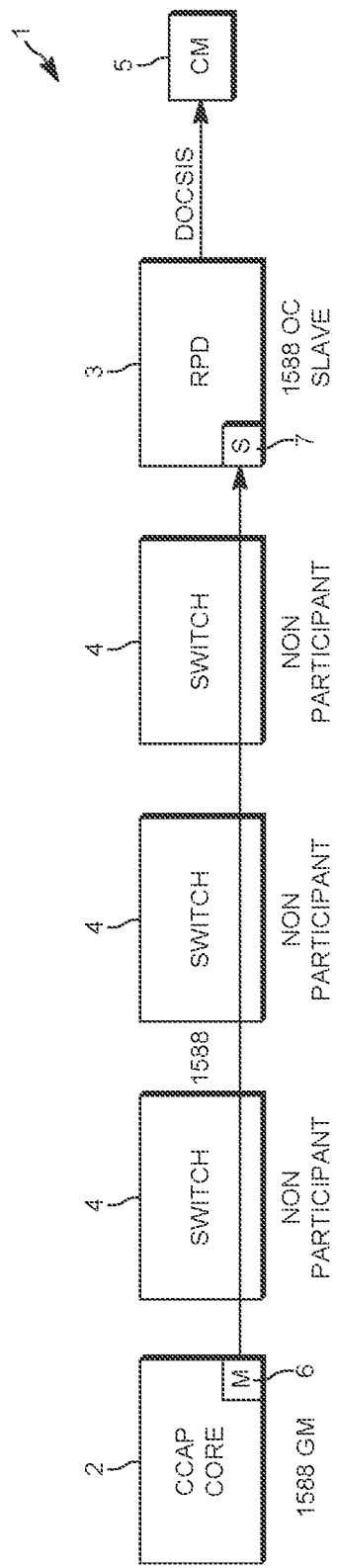
FIG. 1 shows an exemplary timing arrangement for an R-PHY system where a CCAP core is used as timing grandmaster and Remote PHY Devices (RPDs) are the timing slaves.

Referring to FIG. 1, for example, a first topology 1 may include a CCAP core 2 synchronized with an RPD 3 connected together via a plurality of network switches 4. The RPD 3 is in turn connected to one or more cable modems 5. Synchronization is attained by a grandmaster clock 6 in the core 2 which sends timing information to a slave clock 7 the RPD 3. Those of ordinary skill in the art will appreciate that, although FIG. 1 shows only one RPD 3 connected to the core 2, many such RPDs may be simultaneously connected to the core 2, with each RPD having a slave clock 7 receiving timing information from the grandmaster clock 6 in the core.

Figure 2:
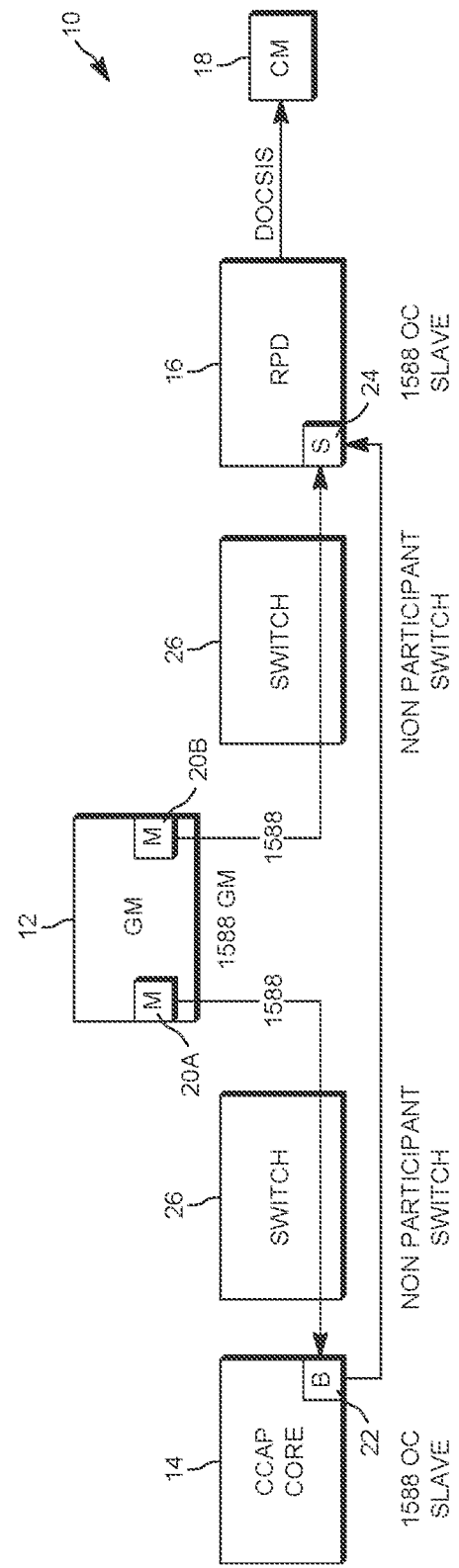
FIG. 2 shows an exemplary timing arrangement for an R-PHY system where both a CCAP core and its RPDs are timing slaves to an external grandmaster clock (GM).

FIG. 2 shows a second topology 10 to provide synchronization between a CCAP core 14 and an RPD 16, which again is connected to one or more cable modems 18. Unlike the system of FIG. 1, however, a separate timing grandmaster device 12 provides timing information to both the CCAP core 14 and the RPD 16. Specifically, the timing grandmaster 12 has a first master port 20a connected to a boundary clock 22 in the CCAP core 14 and a second master port 20b connected to a slave clock 24 in the RPD 16. The boundary clock 24 may therefore be a slave to the grandmaster 12 but a master to the slave clock 24 in the RPD. Those of ordinary skill in the art will recognize that the respective clocks of the CCAP core 14 and the RPD 16 may both be connected to a single master port in the timing grandmaster device 12, and the use of separate timing ports 20a and 20b in FIG. 2 is used merely to more easily describe the separate timing processes. The CCAP core 14 may be connected to the timing grandmaster 12 through one or more switches 26 while the RPD 16 may be connected to the timing grandmaster 12 through one or more switches 28. Again, those of ordinary skill in the art will appreciate that, although FIG. 2 shows only one RPD 16 connected to the timing grandmaster 12, many such RPDs may be simultaneously connected to the grandmaster 12, with each RPD having a slave clock 24 receiving timing information from a port 20b in the grandmaster clock 12.

Due to common performance issues in the CCAP core, the topology 10 shown in FIG. 2 is usually more reliable than that shown in FIG. 1. However, one drawback of the topology 10 shown in FIG. 2 is that neither the core 14 nor the RPD 16 can easily identify their phase offset from each other. Thus, in order to fulfill the 1ms tolerance permitted by the R-DTI specification, that 1ms phase offset budget is split into two 0.5 ms offsets from the grandmaster 12 between the core 14 and the RPD 16.

While both the core 14 and the RPD 16 are locked with the timing grandmaster 12, no significant problems occur, but problems will occur when either the RPD 16 or the core 14 lose connection to the timing grandmaster 12. In that holdover period where one or both devices have no connection to the timing clock of the grandmaster 12, the unconnected devices will drift in frequency and phase from the timing grandmaster 12 and from the other device. The magnitude of that drift will depend on many factors, including the length of the holdover period, temperature variations, internal oscillator performance etc. For example, an RPD with a typical TCXO oscillator might drift 1ms in phase even within one hour. Typically, an RPD's drift is worse than the core's drift as the core usually has a better oscillator and is in a temperature-controlled environment.

When connection to the timing grandmaster 12 is restored, the RPD 16 (or core 14 if the core had lost connection) would measure its phase offset from the grandmaster 12 and would need to adopt one of two methods to correct the offset and re-establish synchronization in both phase and frequency. Ideally, because any phase step adjustment would cause connected cable modems to go offline, the RPD 16 or core 14 only changes its frequency relative to that of the grandmaster 12 to compensate for the phase offset, until such time as the phases are within tolerances, after which the frequency would be set to that of the grandmaster 12. However, to maintain DOCSIS compliance, frequency adjustments must be less than a specified threshold, so compensating for phase drift by frequency adjustments may often take a long time to achieve a desired phase adjustment.

As previously noted, growth in mobile data consumption has put pressure on mobile network operators to build out small cell networks, where all the network traffic needs to be backhauled to the mobile core. Modern cell architectures employ the LTE (Long Term Evolution) 4G standard, which provides for high speed wireless communications for mobile users sufficient to access the Internet to experience services such as data, voice and video from a mobile network. While the LTE standard permits both time division duplex (TDD) and frequency division duplex (FDD), this disclosure will assume that the disclosed LTE systems employ FDD.

While such backhaul has been traditional accomplished via fiber and microwave, hybrid fiber coaxial (HFC) networks have recently been proposed as a backhaul mechanism due to its capacity growth, cost efficiency and speed of deployment. In particular, one HFC topology that has an advantage in supporting LTE-FDD is the Cable Distributed Access Architecture (DAA) and in particular a Remote-PHY (R-PHY) architecture.

Figure 3:
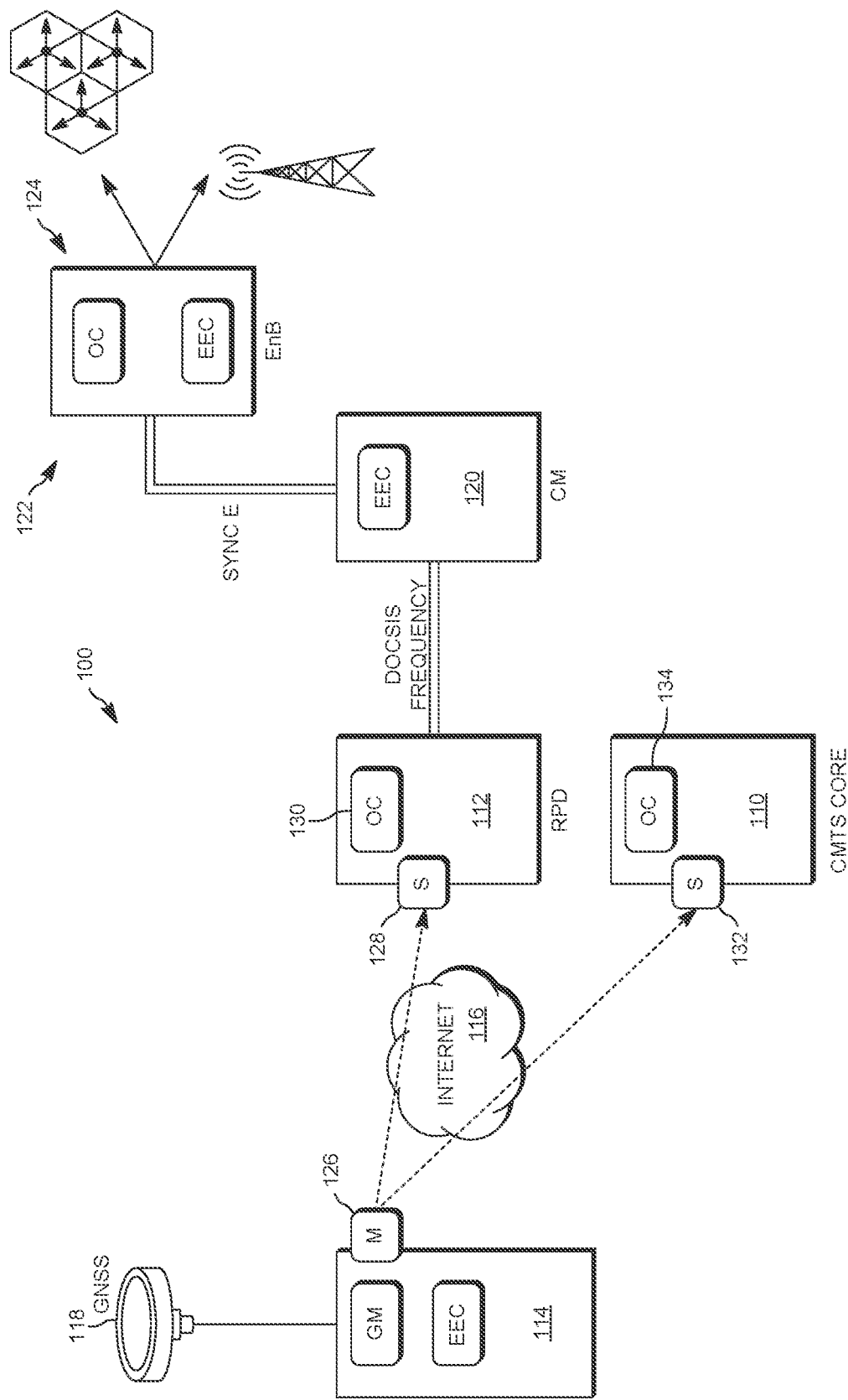
FIG. 3 shows and exemplary R-PHY architecture used as a backhaul for a cellular network.

Referring for example to FIG. 3, an architecture 100 may include a CMTS core 110 and an RPD 112 each connected to a GM clock 114 through a wide area network 116, e.g. the Internet, where the GM in turn receives its timing information from a GNSS satellite 118. The CMTS core 110 and the RPD 112 together provide the transmission path for CATV services to a cable modem 120, which may include television channels, Internet services, video-on demand, and any other service provided to a customer via an HFC transmission network. In addition to providing CATV services traditionally delivered over the HFC transmission network, the architecture 100 also serves as a backhaul for an LTE cell network 122 comprising an EnB 124 that relays communications between user equipment (UEs) such as cell phones and the backhaul network to the Internet.

FIG. 3 accordingly shows two disparate timing protocols to accommodate the dual functions of the R-PHY architecture. Under the DOCSIS protocol, the grandmaster 114 has a master port 126 that provides synchronization to both the single slave port 128 of an ordinary clock 130 in the RPD 112 as well as the single slave port 132 of the ordinary clock 134 in the CMTS core 110. In an R-PHY deployment, the RPD 112 is required to be synchronized to the GM 114 within 1 ms of phase accuracy and within 5 ppm (parts per million) of frequency accuracy.

The architecture 100 shown in FIG. 3 implements a combination of IEEE 1588 and SyncE timing protocols. The RPD 112 is frequency and phase locked to the GM clock 114 through IEEE 1588 timing protocols, and synchronizes the DOCSIS frequency to that timing information. The Cable Modem 120 converts the received DOCSIS frequency to SyncE acting as an EEC clock, and the EnB 124 also acts as an EEC clock that receives SyncE messages from the Cable modem 120 so as to synchronize operation of the devices in an LTE cell network. For LTE operation, mobile base stations must be tightly frequency synchronized to guarantee there are no frequency collisions between upstream and downstream paths. Typical synchronization requirements are that a mobile base station must be frequency synchronized with up to 16 ppb (parts per billion) compared to GPS information from GNSS 112.

As can therefore be easily understood, when using the R-PHY architecture 100 as a backhaul for mobile LTE-FDD communications, difficulties arise due to the need to support two different timing application with different timing requirements on the single clock 130 that resides in the RPD 112. Specifically, the RPD 112 will need to support a tight frequency accuracy of 16 ppb for supporting LTE-FDD (16 ppb) while the phase accuracy of 1 ms must be met for R-PHY operation (LTE-FDD has no phase accuracy requirements). This is problematical because, the RPD will often need to make large phase adjustments in order to re-lock to its time source after a period of holdover following disconnection from the timing grandmaster 114 where the phase of the RPD 112 drifted away significantly (e.g. ~2 ms). When the connection is recovered, the RPD 112 will need to correct the phase offset using only frequency adjustments, as the DOCSIS architecture does not allow performing phase steps, and these frequency adjustments are limited to a rate of change of only 10 ppb/s. Since the frequency offset is bound by the LTE performance of 16 ppb, the time it would take to fix a 2 millisecond phase offset with a maximum of 16 ppb frequency offset is roughly 34 hours, which would likely cause degradation of DOCSIS services during this time.

Nor can the RPD 112 make larger frequency changes to expedite the phase convergence, as doing so will harm mobile LTE-FDD performance. Even if the RPD 112 signals the EnB 124 through SyncE SSM messages that the frequency provided is not valid, so that the EnB 124 enters holdover instead of locking to the RPD 112's frequency, the maximum duration of holdover depends on the ENB oscillator and will in many cases not be more than a minute or so, which is too short an interval and the EnB 124 will not be able to maintain a sufficiently accurate frequency for as much time as it would take the RPD 112 to bring the frequency back to the required accuracy.

To solve this dilemma, an improved system may provide an alternating cycle of short time increments during which the EnB 124 is: (i) not locked to the frequency of the RPD 112, i.e. the EnB 124 is in holdover; and (ii) is locked to the frequency of RPD 112. Within the first time increment, of approximately one minute for example, the RPD 112 can signal the EnB 124 through the cable modem 120 using SyncE SSM messages that the frequency is not valid, so that the EnB 124 enters holdover. During that interval, the RPD can make large frequency changes limited only by the 10 ppb/s rate allowed by DOCSIS. At the end of the first interval, the RPD 112 will change the frequency back to the allowed range of 16 ppb and signal the EnB 124 that the frequency is valid again, so that the EnB 124 will lock onto the clock of the RPD 112. Since the first time increment is short, the EnB 124 will still be able to maintain an accurate enough frequency in its holdover state until it locks onto the RPD 112 frequency in the second time increment. After the second time increment, of 2 minutes as an example, the pattern may repeat. Having a cycle of "large frequency change" slots followed by "valid frequency" slots will significantly reduce the amount of time it will take the RPD 112 to correct a large phase error, while still maintaining quality operation of the LTE mobile system.

Figure 4:
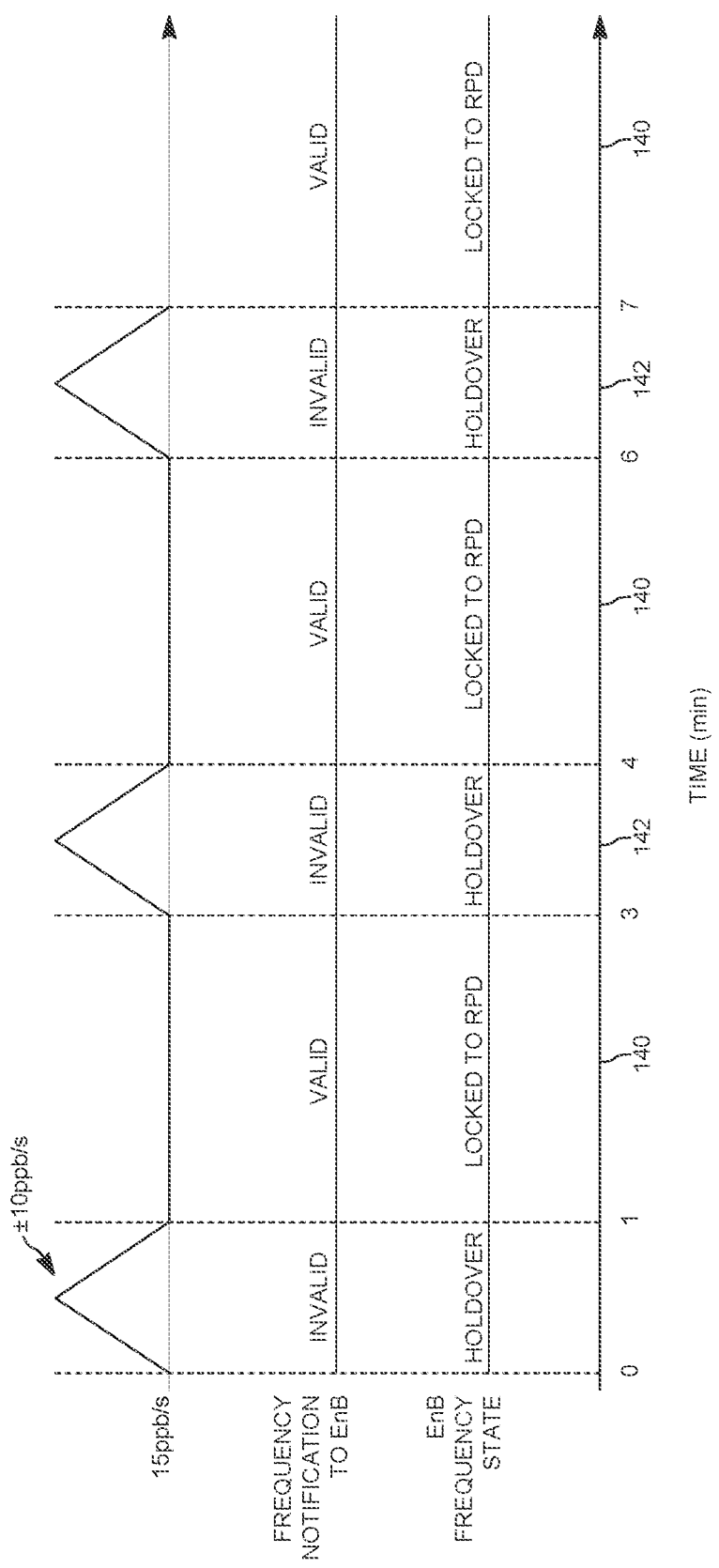
FIG. 4 shows an exemplary phase correction cycle for the system of FIG. 3 for an RPD to resynchronize with a CCAP core.

This is shown in FIG. 4, where a time period during which an RPD 112 applies a frequency adjustment to correct a phase offset from a master clock, which occurred for example during a holdover period when the RPD 112 lost connection to the grandmaster 114, can be divided into a repeating sequence of an interval 140 followed by an interval 142. In the example shown in FIG. 4, the interval 140 may last approximately two minutes when an EnB 124 is locked to the frequency of the RPD 112, which is allowed to correct itself in frequency by a constant rate of 15 ppb. Thus, in interval 140, the phase correction over the interval 140 is determined by the equation Phase=$\int_0^{120} 15 = 1800$ ns.

Upon completion of the two minute interval 140, the RPD 112 signals the EnB 124 that its frequency is no longer valid, and that the EnB 124 should therefore enter holdover operation that is not locked to the frequency of the RPD 112, thus allowing the frequency of the RPD to be adjusted during interval 242 in relatively large increments of 10 ppb/s, during which time the phase correction over the interval 140 is determined by the equation $$\text{Phase} = \int_0^{30} (15 + 10n) + \int_{30}^{60} (315 - 10n) = 9900 \text{ ns}.$$

After completion of the one-minute second interval 142, the RPD 112 signals the EnB 142 to again lock its frequency to that of the RPD 112, and the sequence repeats until the frequency adjustments have brought the phase of the RPD 112 back into tolerance with the grandmaster 114. As can be seen by the above equations, under these assumptions the sequence of a large phase correction during a one-minute holdover of the EnB followed by a smaller phase correction during a two-minute interval where the EnB is locked to the RPS 100 provides a total phase adjustment of 11,700 ns (or approximately 12 μs) over a three minute period, and thus given an exemplary initial phase offset of 2 ms, the RPD 112 could be brought back within tolerance within approximately eight hours, which is roughly 4 times better than the approach of maintaining a constant <16 ppb offset. Moreover, if the EnB 124 can maintain longer holdover durations, and can relock to the RPD frequency quickly, the reduction in time may be even more dramatic. For example, changing the cycle to a 1 min "valid frequency" slot instead of 2 min would result in roughly 11 times faster convergence time (~3 hours in order to compensate for a 2 ms phase offset instead of 34 hours.

Those of ordinary skill in the art will appreciate that many modifications of the disclosed systems and methods exist. As one example, an embodiment of the present disclosure may not provide any frequency adjustment during the first interval 140, reserving all phase corrections for the second interval 142. As another example, other values may be used for the adjustments in either of the first and second intervals, respectively. Thus, the equations described above may be generalized as $$\text{Phase} = \int_0^A x, \, x \geq 0$$

for the first interval and $$\text{Phase} = \int_0^D (x + yn) + \int_D^{2D} ((yD + x) - yn)$$

for the second interval. As another example, an embodiment of the present disclosure may include more than two intervals, repeating in a desired pattern. For example, a phase correction may be employed with a one-minute interval where the RPD clock is locked to that of the EnB, followed by a first holdover interval of one-minute with a large phase adjustment of A, followed by a one-minute interval where the RPD clock is locked to that of the EnB, followed by a second holdover interval of one-minute with a large phase adjustment of B, different than A, where the four-interval sequence then repeats. Still further, any of the disclosed systems and methods could be used with IEEE 1588 messaging to an EnB rather than syncE messaging, since IEEE 1588 utilizes announce messages that could signal the EnB to enter holdover.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A remote physical device (RPD) synchronized with a first clock in a distributed access Cable Television (CATV) architecture according to a first timing protocol and used to communicate synchronization messages with a second clock in a cellular network according to a second timing protocol, the RPD configured to correct a phase offset with the first clock using a varying rate of correction.

2. The RPD of claim 1 where the distributed access architecture includes a Remote Physical Device (RPD).

3. The RPD of claim 1 where the cellular network is a Long-Term Evolution, Frequency Division Duplex network.

4. The RPD of claim 1 where during the first interval the RPD corrects the phase offset using a frequency adjustment that is fixed with time.

5. The RPD of claim 4 where the frequency adjustment is no greater than 10 parts-per-billion.

6. The RPD of claim 4 where during the second interval the RPD corrects the phase offset using a frequency adjustment larger than that of the first interval.

7. The RPD of claim 6 where the first interval is longer than the second interval.

8. The RPD of claim 1 where during the second interval the RPD corrects the phase offset using a frequency adjustment that changes with time.

9. The RPD of claim 8 where the frequency adjustment is 10 parts-per-billion per second.

10. The RPD of claim 8 where the second interval is divided into a first portion where the frequency adjustment increases with time and a second portion where the frequency adjustment decreases with time.

11. A method for correcting a phase offset between a remote physical device (RPD) and a first clock in a distributed access architecture to which the RPD is synchronized, the RPD communicating synchronization messages to a second clock in a cellular network, the method comprising correcting the phase offset using a variable rate of adjustment.

12. The method of claim 11 where the distributed access architecture includes a Remote Physical Device (RPD).

13. The method of claim 11 where the cellular network is a Long-Term Evolution, Frequency Division Duplex network.

14. The method of claim 11 where during the first interval the RPD corrects the phase offset using a frequency adjustment that is fixed with time.

15. The method of claim 14 where the frequency adjustment is no greater than 10 parts-per-billion.

16. The method of claim 14 where during the second interval the RPD corrects the phase offset using a frequency adjustment that changes with time.

17. The method of claim 16 where the first interval is longer than the second interval.

18. The method of claim 11 where during the second interval the RPD corrects the phase offset using a frequency adjustment that changes with time.

19. The method of claim 18 where the frequency adjustment is 10 parts-per-billion per second.

20. The method of claim 18 where the second interval is divided into a first portion where the frequency adjustment increases with time and a second portion where the frequency adjustment decreases with time.

* * * * *